United States Patent [19]
Moriya et al.

[11] Patent Number: 5,609,220
[45] Date of Patent: Mar. 11, 1997

[54] OPERATION CONTROL SYSTEM FOR TRAVELING VEHICLE

[75] Inventors: Yukio Moriya; Satoru Koyanagi; Tetsuya Fujimura; Masayuki Nagahama; Kazuyuki Yamazaki; Toru Hishiyama, all of Kawasaki, Japan

[73] Assignee: Kabushiki Kaisha Komatsu Seisakusho, Tokyo, Japan

[21] Appl. No.: 379,603

[22] PCT Filed: Aug. 26, 1993

[86] PCT No.: PCT/JP93/01207

§ 371 Date: Feb. 2, 1995

§ 102(e) Date: Feb. 2, 1995

[87] PCT Pub. No.: WO94/05539

PCT Pub. Date: Mar. 17, 1994

[30] Foreign Application Priority Data

Aug. 27, 1992 [JP] Japan ................................. 4-228603
Apr. 26, 1993 [JP] Japan ................................. 5-099535

[51] Int. Cl.⁶ ........................................................ B62D 7/08
[52] U.S. Cl. ........................ 180/253; 180/65.5; 180/443
[58] Field of Search ................................ 180/252, 253, 180/199, 236, 65.1, 65.5, 65.8, 342, 7.1, 79.1, 79; 364/424.01

[56] References Cited

U.S. PATENT DOCUMENTS 4,175,638 11/1979 Christensen ...................... 180/79.1 X
4,823,899 4/1989 Ron ..................................... 180/236 X
5,222,568 6/1993 Higasa et al. ...................... 180/65.5

FOREIGN PATENT DOCUMENTS 56-71109  11/1954  Japan .
56-8758    1/1981  Japan .
59-223559 12/1984  Japan .
63-35900   9/1988  Japan .
3-235762  10/1991  Japan .
3-107493  11/1991  Japan .
4-95567    2/1992  Japan .
4-217598   8/1992  Japan .

OTHER PUBLICATIONS

International Preliminary Examination Report, PCT Article 36 and Rule 70, English Language.

*Primary Examiner*—Kevin Hurley
*Attorney, Agent, or Firm*—Frishauf, Holtz, Goodman, Langer & Chick

[57] ABSTRACT

When a longitudinal straight traveling mode position A, an oblique traveling mode position B, a transverse traveling mode position C, or spin turning mode position D is selected by a traveling mode changeover switch 21, a signal corresponding to the selection is input to a controller 27. The controller outputs signals to turning actuators 15a and 15b for orienting driving wheels 11a and 11b toward the selected position. With this signal, the turning actuators 15a and 15b causes turning of the driving wheels 11a and 11b. At the same time, turning angle detection sensors 16a and 16b input signals indicative of turning angle of the driving wheels. When the turning angle becomes coincident with a preliminarily set angle, a signal for terminating turning is output to the turning actuators 15a and 15b. By this control, turning action of the turning actuators 15a and 15b is terminated with setting the driving wheels 11a and 11b at the position of the selected orientation.

11 Claims, 11 Drawing Sheets

OPERATION CONTROL SYSTEM FOR TRAVELING VEHICLE

FIELD OF THE INVENTION

The present invention relates to an operation control system for a traveling vehicle to be used for a mobile telescopic aerial platform and so forth for performing longitudinal straight traveling, oblique traveling, transverse traveling, transverse turning, spin turning for orienting the traveling vehicle toward a desired direction associated with work to be done and for traveling.

BACKGROUND ART

As a proposal of this type, there is Japanese Unexamined Utility Model Publication (Kokai) No. Heisei 4-95567, entitled "Traveling System for Mobile Telescopic Aerial Platform". In the prior art disclosed in the above-identified publication, two driving wheels are provided at positions on one diagonal line of a vehicle body, and two idler wheels are provided at the positions on the other diagonal line. By turning of the driving wheels, the mobile telescopic aerial platform is turned toward a desired direction and travels. In the prior art shown in the publication, a selection switch and a foot switch are provided for permitting an operator to select a desired traveling mode among traveling modes of longitudinal straight traveling, oblique traveling, transverse traveling, transverse turning and so forth. After selection of the desired traveling mode by the selection switch, when the foot switch is depressed by the operator, the driving wheels are once turned into a predetermined initial position and subsequently turned into positions adapted to the selected traveling mode. For instance, when the foot switch is depressed after switching the switch into longitudinal straight traveling position, two driving wheels 1a and 1b are turned into the straight traveling position oriented to straight traveling direction (arrow a), as shown in FIG. 1. Also, as shown in FIG. 2, when the foot switch is depressed after switching of the selection switch into oblique traveling position, two driving wheels 1a and 1b are initially turned into the straight traveling position oriented to the straight traveling direction (arrow a) similarly to FIG. 1. Subsequently, the driving wheels 1a and 1b are turned into the position adapted to oblique traveling. On the other hand, when the foot switch is depressed after switching the select switch into the transverse slalom traveling, two driving wheels 1a and 1b are turned into transverse traveling position oriented in transverse direction (arrow b).

Also, as a proposal for moving the traveling vehicle in various desired direction, there is Japanese Unexamined patent Publication No. Heisei 3-235762, entitled "Steering System for Traveling Vehicle". In the prior art disclosed in this publication, two steering and driving wheels and two idler wheels are provided on the vehicle body. The steering and driving wheels are operated to perform longitudinal straight traveling, longitudinal direction turning, transverse traveling, oblique traveling, spin turning and so forth for moving the vehicle a desired direction associated with work to be done. The steering and driving wheels are connected to a cylinder via a link so that the steering and driving wheels are steered by expansion and contraction of the cylinder. In addition, a limit switch which turns ON and OFF depending upon the expansion and contraction stroke of the cylinder is provided. Also, on an operation panel, a traveling direction changeover switch and steering switch are provided so that expansion and contraction of the cylinder is controlled by ON and OFF operation of the traveling direction changeover switch and the steering switch as well as ON and OFF action of the limit switch to change orientation of the steering and driving wheels to travel in the desired direction.

In such prior art, in case of the former prior art disclosed in Japanese Unexamined Utility Model Publication No. Heisei 4-95567, when the operator performs traveling operation, the operator selects the traveling mode, i.e. longitudinal straight traveling, longitudinal direction turning, transverse traveling, oblique traveling, spin turning and so forth, then depresses the foot switch and initiates traveling in the direction toward which the driving wheels are turned after confirming completion of turning of the driving wheels. Accordingly, when the traveling modes are frequently switched during traveling associated with the work to be done, the operation becomes troublesome. Also, the vehicle cannot travel in a period from immediately after switching of the traveling mode to completion of turning of the driving wheels, to make it impossible to quickly move in the desired direction.

On the other hand, in the latter case disclosed in Japanese Unexamined Patent Publication No. Heisei 3-235762, the operator is required to simultaneously operate the traveling direction changeover switch and the steering switch to make operation cumbersome. Furthermore, since the orientation of the steering and driving wheels is detected by the limit switch, the construction becomes complicated and adjustment of the limit switch is time consuming.

The present invention is designed to solve the defects in the prior art and thus, the first object is to provide an operation control system for a traveling vehicle which is less troublesome in operation upon frequently switching traveling modes to shorten a period from immediately after switching of the traveling mode to completion of turning of the driving wheels so that the operation for moving in the desired direction can be easily and quickly done.

The second object of the present invention is to provide an operation control system for a traveling vehicle which simplifies operation, determines steering angle of steering and driving wheels by a command value from a controller to make the normally required limit switch unnecessary for simplification of construction and avoidance of adjustment of position.

DISCLOSURE OF THE INVENTION

In order to accomplish the above-mentioned objects, in an operation control system for the traveling vehicle arranged with a pair of driving wheels along one diagonal line of a vehicle body for turning by means of a turning actuator an idler wheel pivotally along the other diagonal line, the present invention comprises:

- traveling mode selection changeover means for selecting a desired traveling mode among a plurality of traveling modes and control means for controlling driving of said turning actuators, and
- immediately after inputting of a traveling mode signal from the traveling mode selection changeover means to the control means, the controller means drives the turning actuator for turning the driving wheels at a predetermined initial position at selected traveling mode.

A plurality of the traveling vehicles mounting the construction set forth above are connected and a plurality of control means are connected so that when a traveling mode signal is input from the traveling mode selection changeover means to at least one of the control means, the turning actuator is operated immediately to turn the driving wheels to a predetermined initial position in the selected traveling mode.

Also, the plurality of traveling modes may include at least longitudinal straight traveling, oblique traveling, lateral traveling and turning, and a spin turning. In addition to the construction set forth above, the operation control system may further comprise angle detecting the means for detecting turning angle of each driving wheel, and the control signal operates the driving wheel at the predetermined initial position in the selected traveling mode.

With the construction set forth above, the operation control system for the traveling vehicle according to the present invention may instantly turn the driving wheels to the predetermined initial position of a plurality of traveling modes when a traveling mode signal is input from the traveling mode changeover means to the control means. Accordingly, operation upon frequently switching the traveling mode is less complicated and thus a period from immediately after switching of the traveling mode to completion of turning can be shortened to permit operation for moving in the desired direction easily and quickly.

In order to accomplish the above-mentioned objects, an operation control system for a traveling vehicle, according to the present invention, comprises:

steering and driving wheels located at one diagonal position of a vehicle body;

idler wheel located at the other diagonal position of the vehicle body;

a traveling motor for driving the steering and driving wheel in forward and reverse direction;

a steering motor for steering the steering and driving wheel;

an operation lever device to be operated in arbitrary direction of longitudinal and transverse directions and outputting a signal corresponding to the direction of the steering operation;

a traveling mode selection switch for selecting the traveling mode; and a controller outputting control signals for the traveling motors and steering motors on the basis of the output signal of the operation lever device and the traveling mode selected by the traveling mode selection switch.

In the construction set forth above, the controller may includes longitudinal straight traveling and turning traveling mode calculating portion, transverse traveling and turning traveling mode calculating portion, oblique traveling mode calculating portion and spin turning mode calculating portion, the traveling mode selection switch may select first, second, third and forth position, and corresponding to selection, the longitudinal straight traveling and turning traveling mode calculating portion, transverse traveling and turning traveling mode calculating portion, oblique traveling mode calculating portion and spin turning mode calculating portion is selected to output a speed command signal to a speed controller and a steering command signal to a steering driver.

With the construction set forth above, after operating the traveling mode selection switch, the operation lever is operated to perform longitudinal straight and turning traveling, transverse straight and turning traveling, oblique traveling and spin turning corresponding to the first to fourth positions. Accordingly, operation becomes simple. Also, since the steering angle of the steering and driving wheels is determined by the command value from the controller, the limit switch which is normally required otherwise, becomes unnecessary to avoid necessity of cumbersome position adjustment.

BRIEF DESCRIPTION OF THE DRAWINGS

The present invention will be understood more fully from the detailed description given herebelow and from the accompanying drawings of the preferred embodiment of the invention, which, however, should not be taken to be limitative to the present invention, but are for explanation and understanding only.

BEST MODE FOR IMPLEMENTING THE INVENTION

Next, discussion will be given for the first preferred embodiment of an operation control system for a traveling vehicle, according to the present invention with reference to the drawings.

Figure 1:
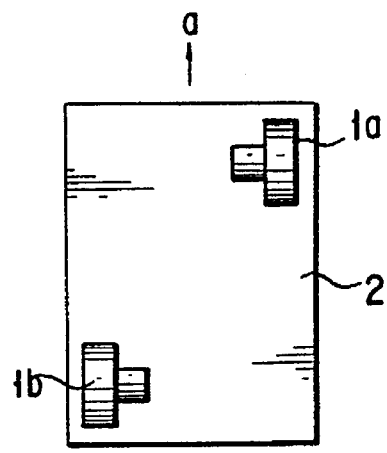
FIG. 1 is an illustration of the prior art in a condition where two driving wheels are oriented in longitudinal straight traveling direction.
Figure 2:
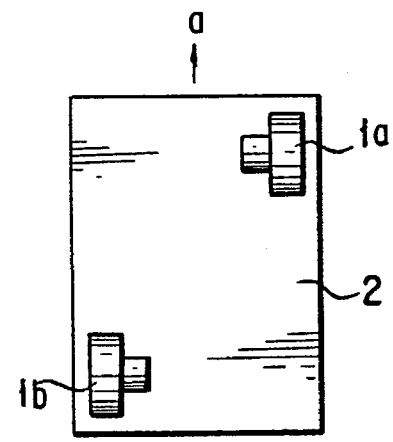
FIG. 2 is an illustration of the prior art in a condition where two driving wheels are oriented in the forward straight traveling position when two driving wheels perform oblique traveling.
Figure 3:
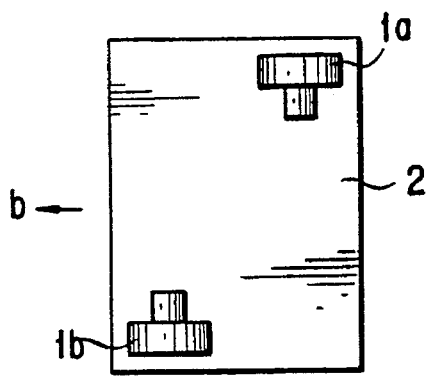
FIG. 3 is an illustration of the prior art where two driving wheels are oriented in a direction for transverse traveling.
Figure 4:
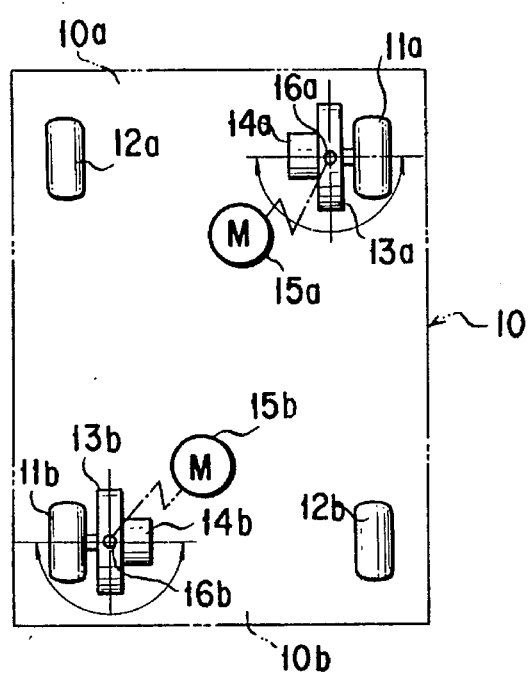
FIG. 4 is a general plan view showing a construction of the first embodiment of an operation control system for a traveling vehicle according to the present invention.

FIG. 4 is a plan view showing a construction of the first embodiment of an operation control system for a traveling vehicle according to the present invention. In FIG. 4, on a vehicle body 10 forming a traveling truck in a mobile telescopic aerial platform has driving wheels 11a and 11b at the right side of the front portion 10a and the left side of the rear portion 10b for pivotal turning in an angular range of 180°. Idler wheels 12a and 12b are provided at the left side of the front portion 10a and the right side of the rear portion 10b of the vehicle body 10 in rotatable fashion. The driving wheel 11a is rotatably provided on a bracket 13a and adapted to be driven by a traveling motor 14a. The bracket 13a is pivotable by a turning actuator 15a. Namely, the bracket 13a is turned to change orientation and the turning angle is detected by a turning angle detection sensor 16a. The driving wheel 11b has the same construction to the driving wheel 11a and thus has a bracket 13b, a traveling motor 14b, a turning actuator 15b and a turning angle detection sensor 16b.

It should be noted that a mechanism for turning the driving wheels 11a and 11b is not specified to the shown construction and can be constructed in other manners. Also, the turning actuator 15a may be either a motor or a cylinder. In case of the motor, revolution thereof is transmitted to a support shaft of the bracket 13a to cause pivotal motion. On the other hand, in case of the cylinder, a chain is driven by the cylinder and the bracket may be pivoted through a sprocket provided on the support shaft and driven by the chain. Alternatively, a link mechanism may be employed for pivoting the bracket by the cylinder via the link mechanism.

Figure 5:
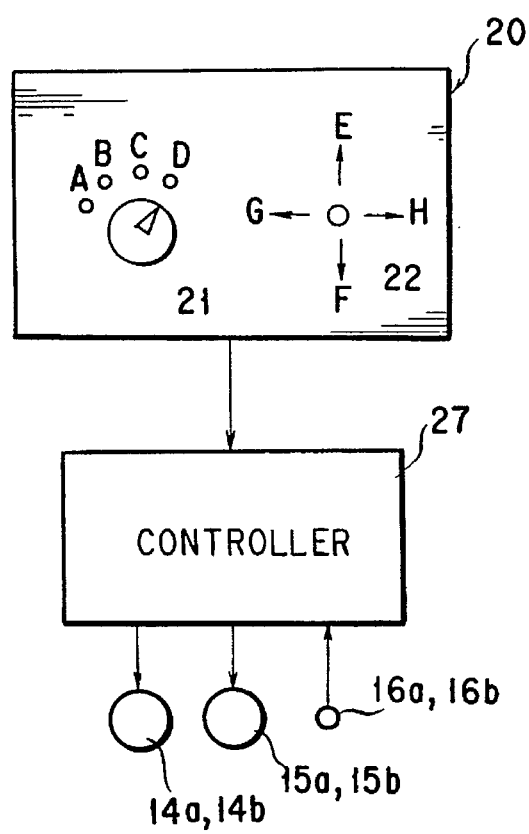
FIG. 5 is an illustration showing a construction of an operation box and a controller in the first embodiment.

FIG. 5 is an illustration showing a construction of an operation box 20 and a controller 27. In FIG. 5, the operation box 20 is provided with a traveling mode changeover switch 21 and a traveling lever 22.

The traveling mode changeover switch 21 is switched by an operator to a longitudinal straight traveling mode position A, an oblique traveling mode position B, a transverse traveling mode position C and a spin turning mode position D, for selection and feeds a selected traveling mode signal to the controller 27.

The traveling lever 22 is designed to be operated by the operator to tilt to a forward traveling side E, a backward traveling side F, a left transverse traveling side G and a right transverse traveling side H for performing control of traveling behavior of the vehicle, e.g. traveling speed and traveling direction. Control of traveling behavior by the traveling lever 22 may be performed in the manner known in the art. An operation signal generated by the operation of the traveling lever 22 is output to the controller 27. The controller 27 outputs drive signals for traveling motors 14a and 14b and the turning actuators 15a and 15b. The controller 27 also receives signals indicative of turning angle of the driving wheels from the turning angle detection sensors 16a and 16b. Also, in the controller 27, a predetermined initial position in the longitudinal straight traveling mode position A to spin turning mode position D, such as the position wherein driving wheels are aligned in longitudinal direction, is stored. Also, a position where the driving wheels are aligned to the transverse direction and a pivoting angular position where the driving wheels are oriented to be perpendicular to the diagonal line extending through the center of the vehicle body 10 is stored.

Next, function and operation of the controller 27 in the first embodiment will be discussed.

The controller 27 controls a traveling mode selected by the traveling mode changeover switch 21 for the individual mobile telescopic aerial platform or two mobile telescopic aerial platforms connected to each other. Namely, when the traveling mode changeover switch 21 is switched to the longitudinal straight traveling mode position A or to spin turning mode position D, the controller 27 performs control for the respective selected mode.

At first, discussion will be given for the case of the individual mobile telescopic aerial platform and when the traveling mode changeover switch 21 is switched into the longitudinal straight traveling mode position A.

Figure 6:
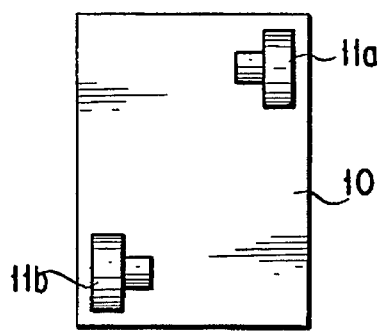
FIG. 6 is an illustration showing orientation of the driving wheels in the case where a traveling mode changeover switch is switched into a longitudinal straight traveling mode in the first embodiment.

FIG. 6 is an illustration showing orientations of the driving wheels 11a and 11b when the traveling mode changeover switch 21 is switched into the longitudinal straight traveling mode position A. In FIG. 6, when the traveling mode changeover switch 21 is switched into the longitudinal straight traveling mode position A, a longitudinal straight traveling mode signal is input to the controller 27. The controller 27 outputs a signal for aligning the driving wheels 11a and 11b in the longitudinal direction to the turning actuators 15a and 15b. With this signal, the turning actuators 15a and 15b cause turning of the driving wheels 11a and 11b. At the same time, signals indicative of the turning angle of the driving wheels 11a and 11b are input from the turning angle detection sensors 16a and 16b to the controller 27. The controller 27 thus detects the turning angle of the driving wheels 11a and 11b coincident with a first angle which will be discussed later to output a signal to the turning actuators 15a and 15b for commanding stopping of turning. By this control, the turning operation of the turning actuators 15a and 15b is terminated and orientation of the driving wheels 11a and 11b is completed. After initializing the orientation of the driving wheels 11a and 11b, longitudinal straight traveling control is performed by the operator through the traveling lever 22 in the manner known in the art.

Next, discussion will be given for the case where the traveling mode changeover switch 21 is switched into the oblique traveling mode position B.

Figure 7:
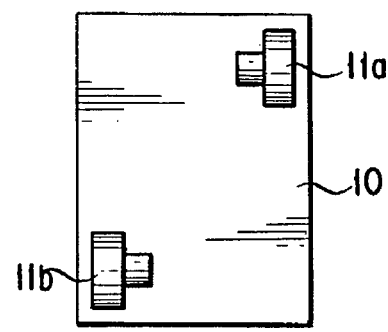
FIG. 7 is an illustration showing orientation of the driving wheels in the case where a traveling mode changeover switch is switched into an oblique traveling mode in the first embodiment.

FIG. 7 is an illustration showing orientation of the driving wheels 11a and 11b when the traveling mode changeover switch 21 is switched into the oblique traveling mode position B. In FIG. 7, when the traveling mode changeover switch 21 is switched into the oblique traveling mode position B, an oblique traveling mode signal is input to the controller 27. The controller 27 outputs a signal for aligning the driving wheels 11a and 11b in the longitudinal direction to the turning actuators 15a and 15b. With this signal, the turning actuators 15a and 15b cause turning of the driving wheels 11a and 11b. At the same time, signals indicative of the turning angle of the driving wheels 11a and 11b are input from the turning angle detection sensors 16a and 16b to the controller 27. The controller 27 thus detects the turning angle of the driving wheels 11a and 11b coincident with the first angle to output a signal to the turning actuators 15a and 15b for commanding stopping of turning. By this control, the turning operation of the turning actuators 15a and 15b is terminated and orientation of the driving wheels 11a and 11b is completed. Subsequently, operation for oblique traveling is performed by the operator through the traveling lever 22 in the manner known in the art.

Next, discussion will be given for the case where the traveling mode changeover switch 21 is switched into the transverse traveling mode position C.

Figure 8:
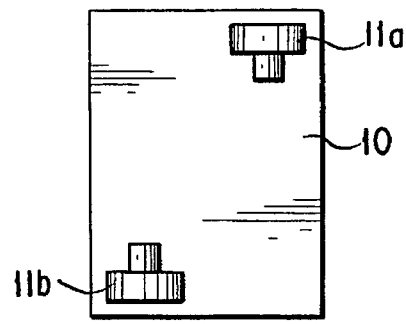
FIG. 8 is an illustration showing orientation of the driving wheels in the case where a traveling mode changeover switch is switched into a transverse-traveling mode in the first embodiment.

FIG. 8 is an illustration showing orientation of the driving wheels 11a and 11b when the traveling mode changeover switch 21 is switched into the transverse traveling mode position C. In FIG. 8, when the traveling mode changeover switch 21 is switched into the transverse traveling mode position C, a transverse traveling mode signal is input to the controller 27. The controller 27 outputs a signal for aligning the driving wheels 11a and 11b in the transverse direction to the turning actuators 15a and 15b. With this signal, the turning actuators 15a and 15b cause turning of the driving wheels 11a and 11b. At the same time, signals indicative of the turning angle of the driving wheels 11a and 11b are input from the turning angle detection sensors 16a and 16b to the controller 27. The controller 27 thus detects the turning angle of the driving wheels 11a and 11b coincident with a second angle which will be discussed later to output a signal to the turning actuators 15a and 15b for commanding stopping of turning. By this control, the turning operation of the turning actuators 15a and 15b is terminated and orientation of the driving wheels 11a and 11b to be in alignment with the transverse direction is completed. After initializing the orientation of the driving wheels 11a and 11b, transverse traveling mode control is performed by the operator through the traveling lever 22 in the manner known in the art.

Next, discussion will be given for the case where the traveling mode changeover switch 21 is switched into the spin turning mode position D.

Figure 9:
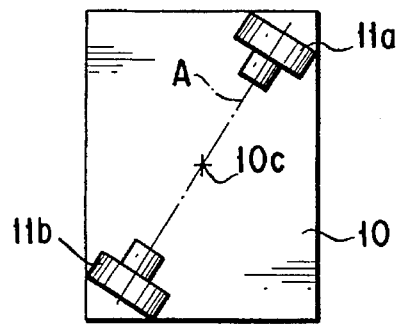
FIG. 9 is an illustration showing orientation of the driving wheels in the case where a traveling mode changeover switch is switched into a spin turning mode in the first embodiment.

FIG. 9 is an illustration showing orientation of the driving wheels 11a and 11b when the traveling mode changeover switch 21 is switched into the spin turning mode position D. In FIG. 9, when the traveling mode changeover switch 21 is switched into the spin turning mode position D, a spin turning mode signal is input to the controller 27. The controller 27 outputs a signal for orienting the driving wheels 11a and 11b at angular positions perpendicular to an diagonal line A on which the driving wheels 11a and 11b are aligned, to the turning actuators 15a and 15b. With this signal, the turning actuators 15a and 15b cause turning of the driving wheels 11a and 11b. At the same time, signals indicative of the turning angle of the driving wheels 11a and 11b are input from the turning angle detection sensors 16a and 16b to the controller 27. The controller 27 thus detects the turning angle of the driving wheels 11a and 11b coincident with a predetermined angle to output a signal to the turning actuators 15a and 15b for commanding stopping of turning. By this control, the turning operation of the turning actuators 15a and 15b is terminated and orientation of the driving wheels 11a and 11b to the predetermined angle is completed. After initializing the orientation of the driving wheels 11a and 11b, spin turning traveling mode control is performed by the operator through the traveling lever 22 in the manner known in the art.

It should be noted that the first to third angles are preliminarily set in the controller with reference to the orientation where the driving wheels are in alignment with the longitudinal direction.

After turning the driving wheels 11a and 11b to the predetermined orientation, traveling of the vehicle is initiated. At this time, forward drive signals or reverse drive signals are input from the controller 27 to the traveling motors 14a and 14b to perform traveling in the predetermined direction.

Next, discussion will be given for the case where two mobile telescopic aerial platforms are connected.

In this case, the vehicle bodies 10 of two mobile telescopic aerial platforms are connected in parallel relationship by a pair of couplers 30a and 30b, as shown in FIGS. 10 to 13. Also, two controllers 27 provided on the vehicle bodies are connected by a control cable 33. By this connection, it is permitted to operate the operation box 20 of either one of the vehicle bodies 10 so that one of the controllers 27 may control four driving wheels 11a and 11b on two vehicle bodies 10 for turning on the basis of operation of one operation box 20 to be set at the predetermined position.

Next, discussion will be given for the case of the individual mobile telescopic aerial platform and when the traveling mode changeover switch 21 is switched into the longitudinal straight traveling mode position A in the condition where two vehicle bodies 10 are connected.

Figure 10:
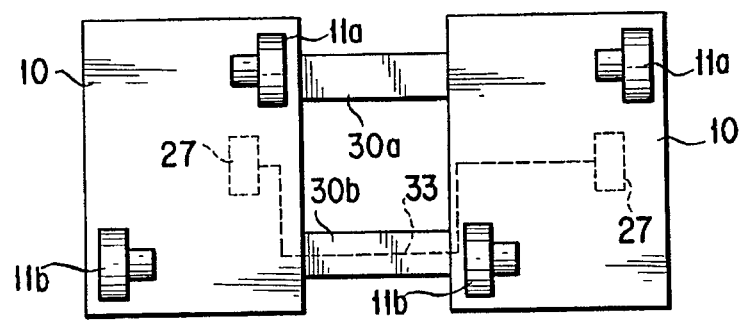
FIG. 10 is an illustration showing orientation of the driving wheels in the case where two vehicles are connected and the traveling mode changeover switch is switched into the longitudinal straight traveling mode, in the first embodiment.

FIG. 10 is an illustration showing orientations of the driving wheels 11a and 11b when the traveling mode changeover switch 21 is switched into the longitudinal straight traveling mode position A in the condition where two vehicle bodies 10 are connected. In FIG. 10, when one of the traveling mode changeover switches 21 is switched into the longitudinal straight traveling mode position A, a longitudinal straight traveling mode signal is input to the two controllers 27. In this case, it may be possible to transmit the signal to the controller, to which the operation box is not connected, from the controller, to which the operation box is connected by communication. Two controllers 27 output signals for aligning the four driving wheels 11a and 11b in the longitudinal direction to the four turning actuators 15a and 15b. With this signal, the four turning actuators 15a and 15b cause turning of the four driving wheels 11a and 11b. At the same time, signals indicative of the turning angles of the driving wheels 11a and 11b are input from the four turning angle detection sensors 16a and 16b to the two controllers 27. The two controllers 27 thus detect the turning angle of the driving wheels 11a and 11b coincident with the first angle to output a signal to the turning actuators 15a and 15b for commanding stopping of turning. By this control, the turning operation of the turning actuators 15a and 15b is terminated and orientation of the four driving wheels 11a and 11b is completed.

Next, discussion will be given for the case where the traveling mode changeover switch 21 is switched into the oblique traveling mode position B in the condition where two vehicle bodies 10 are connected.

Figure 11:
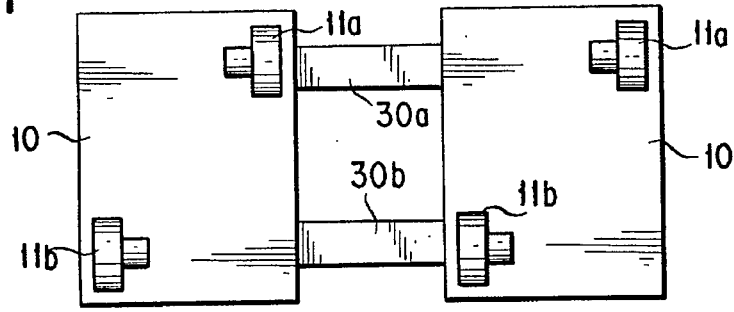
FIG. 11 is an illustration showing orientation of the driving wheels in the case where two vehicles are connected and the traveling mode changeover switch is switched into the oblique traveling mode, in the first embodiment.

FIG. 11 is an illustration showing orientation of the driving wheels 11a and 11b when the traveling mode changeover switch 21 is switched into the oblique traveling mode position B in the condition where two vehicle bodies 10 are connected. In FIG. 11, when the traveling mode changeover switch 21 is switched into the oblique traveling mode position B, an oblique traveling mode signal is input to the two controllers 27. The two controllers 27 output signals for aligning the driving wheels 11a and 11b in the longitudinal direction to the four turning actuators 15a and 15b. With this signal, the four turning actuators 15a and 15b cause turning of the four driving wheels 11a and 11b. At the same time, signals indicative of the turning angle of the driving wheels 11a and 11b are input from the turning angle detection sensors 16a and 16b to the two controller 27. The controllers 27 thus detect the turning angle of the driving wheels 11a and 11b coincident with the first angle to output a signal to the four turning actuators 15a and 15b for commanding stopping of turning. By this control, the turning operation of the turning actuators 15a and 15b is terminated and orientation of the driving wheels 11a and 11b is completed. Subsequently, operation for oblique traveling is performed.

Next, discussion will be given for the case where the traveling mode changeover switch 21 is switched into the transverse traveling mode position C in the condition where two vehicle bodies 10 are connected.

Figure 12:
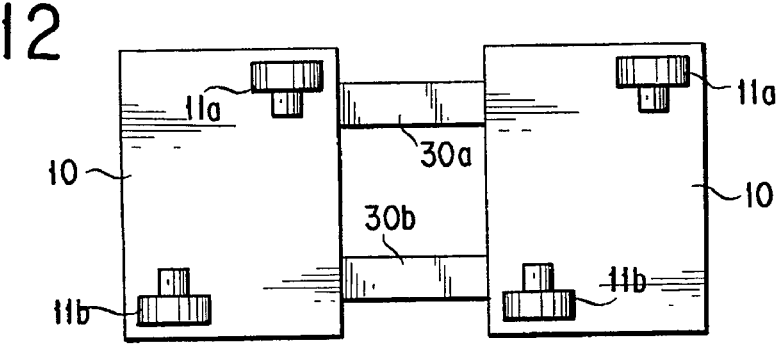
FIG. 12 is an illustration showing orientation of the driving wheels in the case where two vehicles are connected and the traveling mode changeover switch is switched into the transverse traveling mode, in the first embodiment.

FIG. 12 is an illustration showing orientation of the driving wheels 11a and 11b when the traveling mode changeover switch 21 is switched into the transverse traveling mode position C in the condition where two vehicle bodies 10 are connected. In FIG. 12, when the traveling mode changeover switch 21 is switched into the transverse traveling mode position C, a transverse traveling mode signal is input to the controllers 27. The two controllers 27 output signals for aligning the four driving wheels 11a and 11b in the transverse direction to the four turning actuators 15a and 15b, as shown in FIG. 12. With this signal, the four turning actuators 15a and 15b cause turning of the four driving wheels 11a and 11b. At the same time, signals indicative of the turning angle of the driving wheels 11a and 11b are input from the turning angle detection sensors 16a and 16b to the two controllers 27. The controllers 27 thus detect the turning angle of the driving wheels 11a and 11b coincident with the second angle to output a signal to the four turning actuators 15a and 15b for commanding stopping of turning. By this control, the turning operation of the four turning actuators 15a and 15b is terminated and orientation of the four driving wheels 11a and 11b to be in alignment with the transverse direction is completed.

Next, discussion will be given for the case where the traveling mode changeover switch 21 is switched into the spin turning mode position D in the condition where two vehicle bodies 10 are connected.

Figure 13:
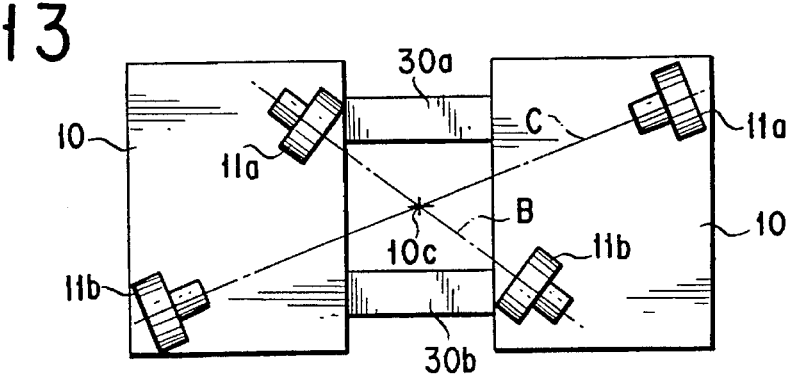
FIG. 13 is an illustration showing orientation of the driving wheels in the case where two vehicles are connected and the traveling mode changeover switch is switched into the spin turning mode, in the first embodiment.

FIG. 13 is an illustration showing orientation of the driving wheels 11a and 11b when the traveling mode changeover switch 21 is switched into the spin turning mode position D in the condition where two vehicle bodies 10 are connected. In FIG. 13, when the traveling mode changeover switch 21 is switched into the spin turning mode position D, a spin turning mode signal is input to the two controllers 27. The two controllers 27 output signals for orienting the four driving wheels 11a and 11b at angular positions perpendicular to an diagonal line A on which the driving wheels 11a and 11b are aligned, to the four turning actuators 15a and 15b, as shown in FIG. 13. With this signal, the four turning actuators 15a and 15b cause turning of the four driving wheels 11a and 11b. At the same time, signals indicative of the turning angle of the driving wheels 11a and 11b are input from the turning angle detection sensors 16a and 16b to the two controllers 27. The two controllers 27 thus detect the turning angle of the driving wheels 11a and 11b coincident with a predetermined third angle to output a signal to the four turning actuators 15a and 15b for commanding stopping of turning. By this control, the turning operation of the four turning actuators 15a and 15b is terminated and orientation of the four driving wheels 11a and 11b to the predetermined angle is completed.

As can be clear from the discussion given hereabove, in the first embodiment, when one of the traveling modes is selected by operating the traveling mode changeover switch 21, the driving wheels 11 are instantly turned into the predetermined initial position in the selected traveling mode.

Accordingly, when the traveling mode is to be switched, it is required to operate only the traveling mode changeover switch 21 to avoid complexity in switching of the traveling mode and thus shorten a period from immediately after switching of the traveling mode to completion of turning of the driving wheels to perform operation for traveling to the desired direction easily and quickly.

Next, the second preferred embodiment of the operation control system for the traveling vehicle according to the present invention will be discussed in detail with reference to the drawings.

Figure 14:
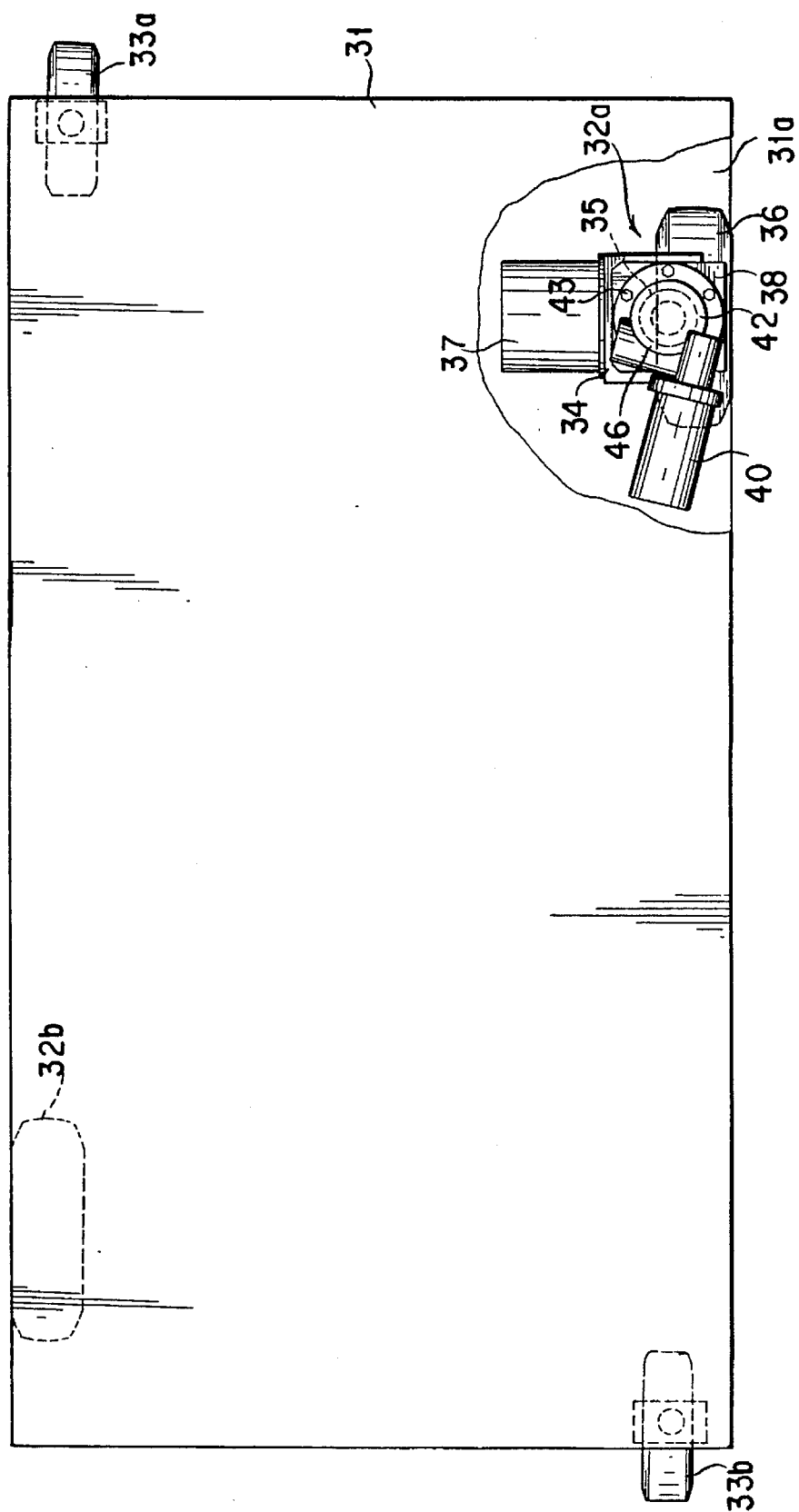
FIG. 14 is a top plan view showing the operation control system for the traveling vehicle according to the present invention.
Figure 15:
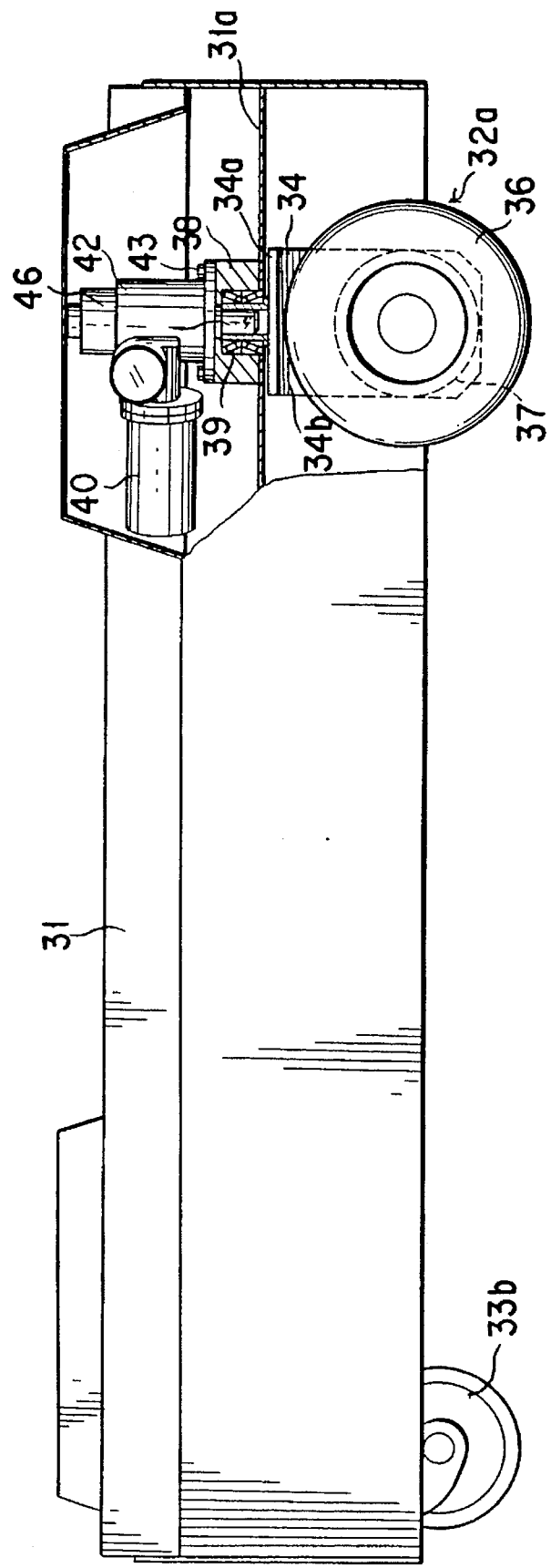
FIG. 15 is a side elevation showing the construction illustrated in FIG. 14.

FIG. 14 is a partially cut out top plan view showing the construction of the operation control system for the traveling vehicle according to the present invention, and FIG. 15 is a side elevation thereof. In FIGS. 14 and 15, there is illustrated the operation control system for the traveling vehicle as applied for the mobile telescopic aerial platform. Steering and driving wheels 32a and 32b are provided at the right side of the front portion and left side of the rear portion of a vehicle body 31. On the other hand, at the left side of front portion and the right side of the rear portion of the vehicle body, caster wheels 33a and 33b are provided, respectively. The steering and driving wheel 32a is mounted to a lateral piece 34a of an essentially L-shaped bracket 34 through a support axle 35. Also, on a vertical piece 34b, a wheel 36 and a traveling motor 37 are mounted. The support axle 35 is pivotally mounted on a mounting body 38 which is mounted on a transverse plate 31a of the vehicle body 31 via a bearing 39 for turning. On the mounting body 38, a steering motor 40 with a reduction gear unit is mounted. The support axle 35 is connected to a rotary output shaft 41. The steering motor 40 is provided horizontally on a reduction gear unit housing 42 and the rotary output shaft 41 is oriented vertically. The reduction gear unit housing 42 is mounted on the upper surface of the mounting body 38 by means of bolts 43. The steering motor 40 is provided horizontally and in parallel relationship with the transverse plate 31a. With such construction, the thickness of the device can be made small.

Figure 16:
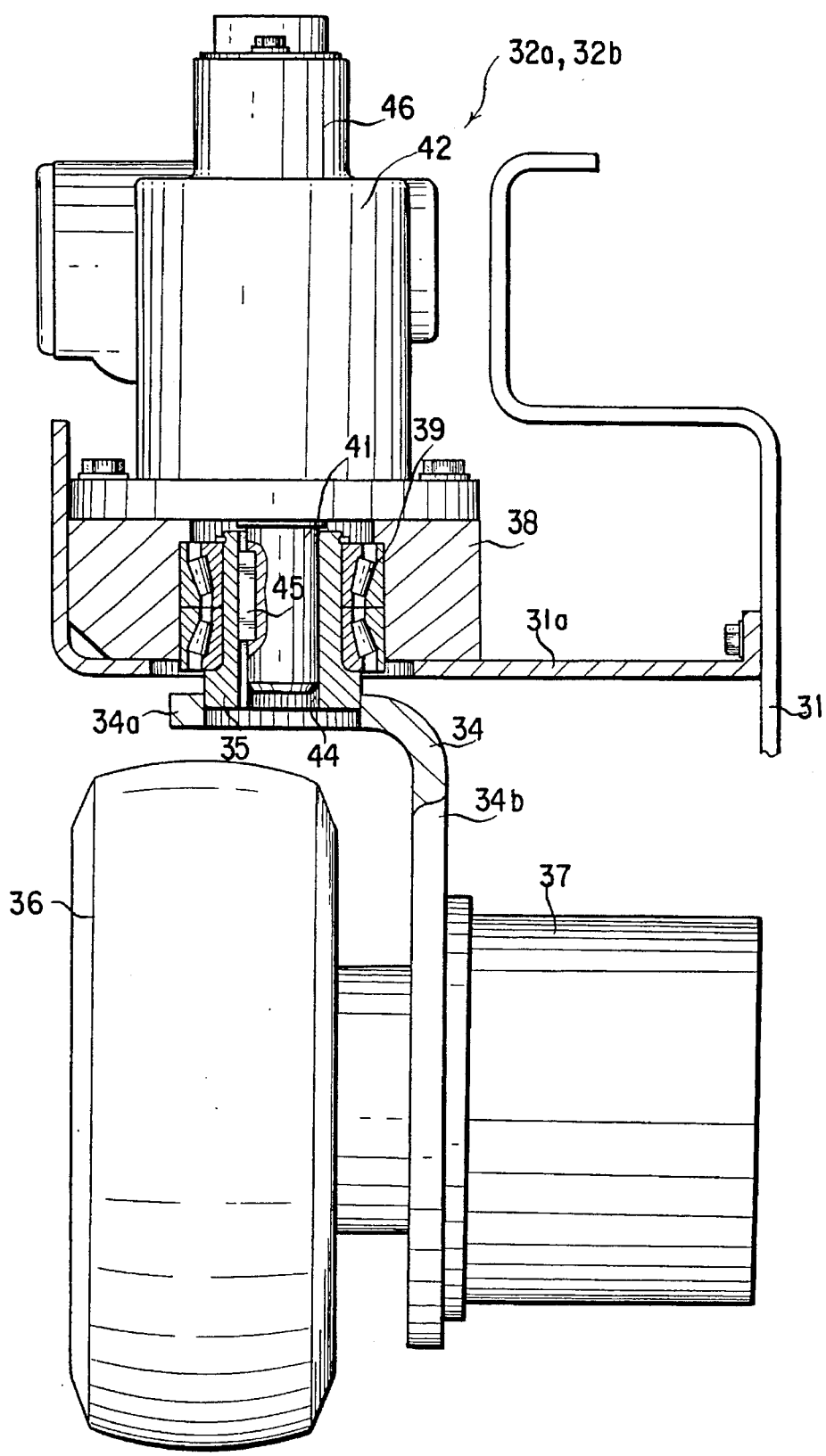
FIG. 16 is a side elevation showing a section of a support shaft in the second embodiment of the steering and driving wheel.

FIG. 16 is a side elevation showing a section of the support axle 35 in the steering and driving wheel 32a. In FIG. 16, the support axle 35 has a hollow vertical bore 44. In the vertical bore 44, the rotary output shaft 41 is engaged and keyed by a key 45. In this case, the rotary output shaft 41 is rotated to pivot the bracket 34 to vary orientation of the wheel 36 to move the vehicle body 31. Namely, steering operation of the traveling vehicle is thus performed. On the other hand, a rotational angle sensor 46 for detecting the rotational angle of the rotary output shaft 41 of the steering motor 40 is mounted at the upper portion of the reduction gear unit housing 42. It should be noted that the steering and driving wheel 32b has the same construction to the steering and driving wheel 32a.

Next, discussion will be given for the operation box.

Figure 17:
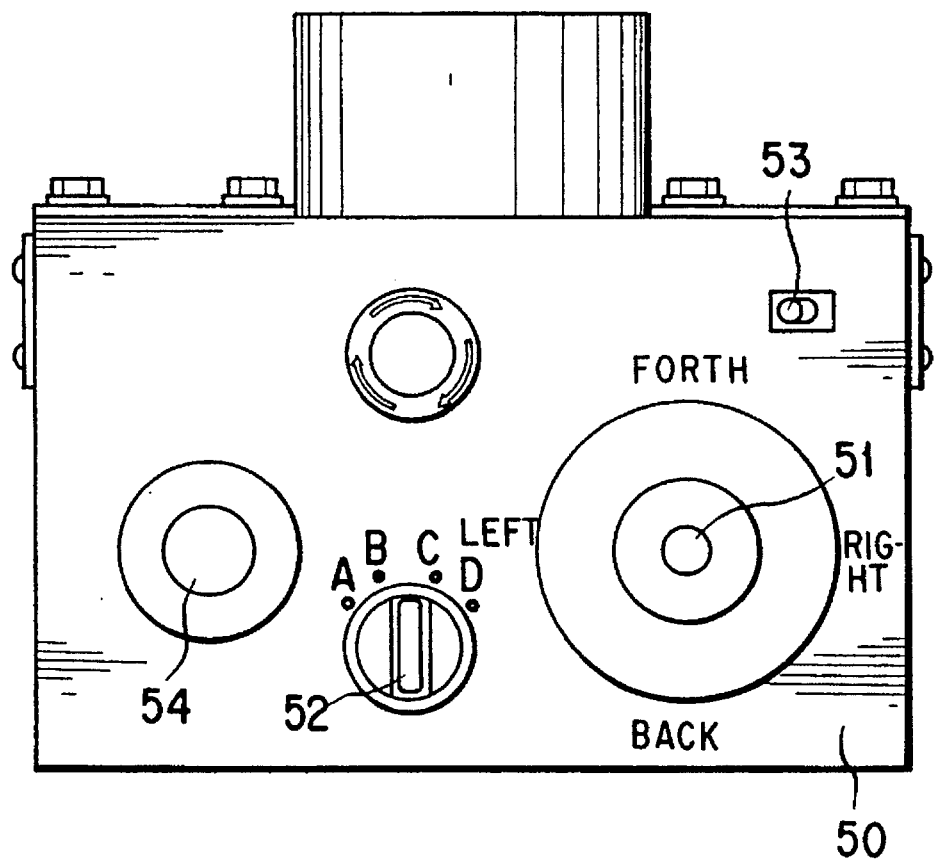
FIG. 17 is a front elevation showing an arrangement of an operation box for moving the vehicle body in the desired direction in the second embodiment.

FIG. 17 is a front elevation showing arrangement of the operation box for moving the vehicle body 31 in the desired direction by driving the steering and driving wheels 32a and 32b. In FIG. 17, the operation box has an operation lever 51 provided in a main body 50, a traveling mode selector switch 52 for selecting the traveling mode among a first position A corresponding to the longitudinal straight traveling, a second position B corresponding to the lateral traveling, a third position C corresponding to oblique traveling, and a fourth position D corresponding to spin turning, and a high speed/low speed changeover switch 53 for switching between high speed traveling and low speed traveling by switching thereof. Also, a lifting lever 54 for lifting up and down a not shown working platform in the traveling vehicle. In the main body 50, a controller and so forth, which will be discussed in detail later, is provided.

Next, electrical construction in the second embodiment will be discussed.

Figure 18:
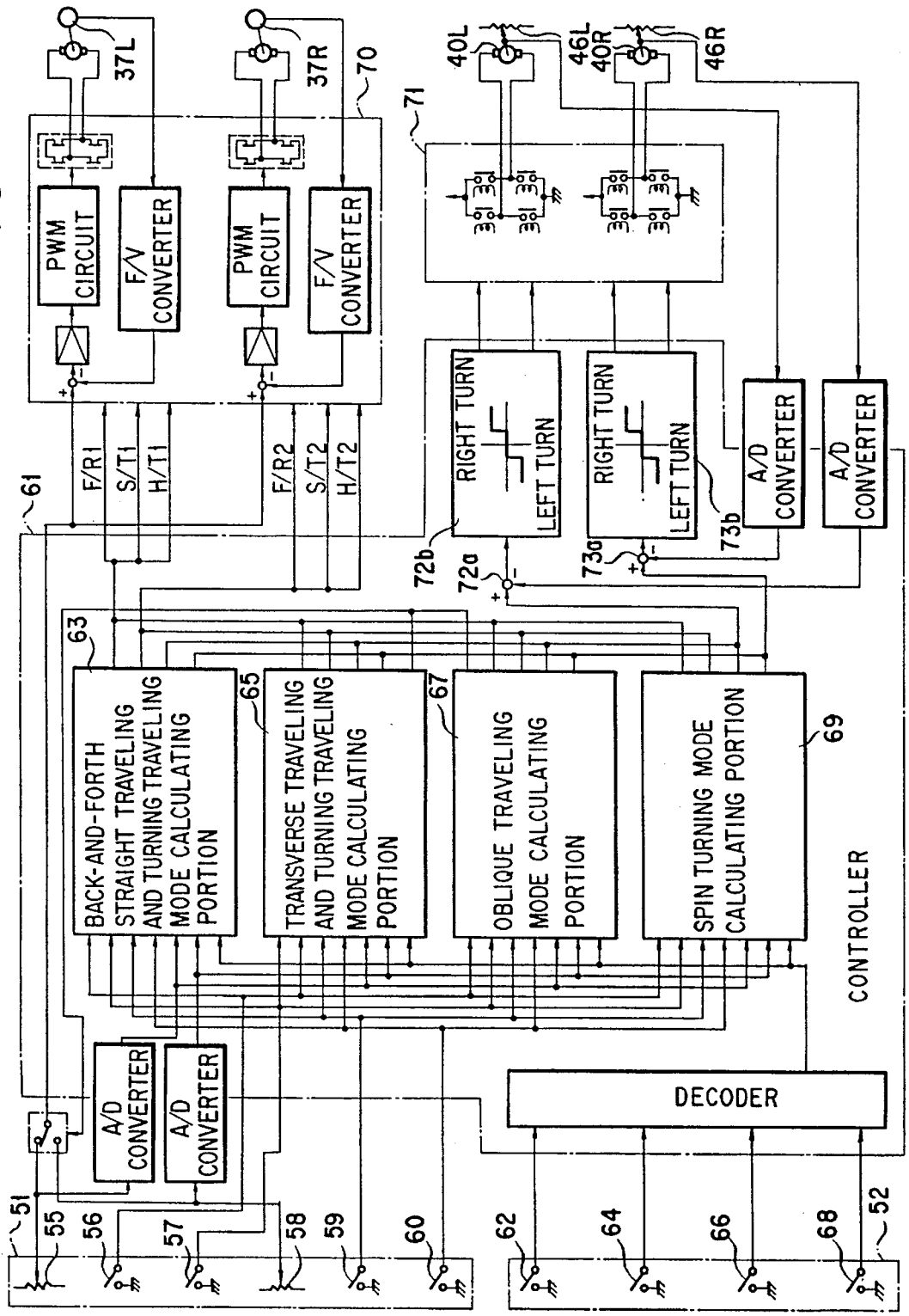
FIG. 18 is a block diagram showing a part of a circuit forming a controller in the second embodiment.

FIG. 18 is a block diagram showing the electrical construction partly in a form of circuit. In FIG. 18, the operation lever 51 outputs a coordinate (X-axis and Y-axis) signal depending upon an operational direction and an operation magnitude when it is operated in the longitudinal direction and left and right direction, and is constructed as a so-called joystick. The operation lever 51 is also provided with a first potentiometer 55 outputting a signal proportional to the operation magnitude in the longitudinal, a forward switch 56 which is turned ON upon operation in the forward direction, and a reverse switch 57 which is turned ON upon operation in the reverse direction. Also, a second potentiometer 58 outputting a signal depending upon the operation magnitude in the left and right directions, a left switch 59 which is turned ON upon operation toward the left and a right switch 60 which is turned ON upon operation toward the right. ON and OFF signals of these forward switch 56 to the right switch 60 are fed to the controller 61.

When a command of the traveling mode selector switch 52 is the first position A, a first switch 62 is turned ON to input an ON signal indicative of the longitudinal straight traveling mode to a longitudinal straight traveling and turning traveling mode calculating portion 63 in the controller 61 through a decoder. Also, when the traveling mode selector switch 52 is in the second position B, a second switch 64 is turned ON to input an ON signal indicative of the transverse traveling mode to a transverse traveling and turning traveling mode calculating portion 65 in the controller 61. When the traveling mode selector switch 52 is in the third position C, a third switch 66 is turned on to input an ON signal indicative of the oblique traveling mode to an oblique traveling mode calculating portion 67 in the controller 61. When the traveling mode selector switch 52 is in the fourth position D, a fourth switch 68 is turned ON to input an ON signal indicative of spin turning to a spin turning mode calculating portion 69 in the controller 61.

The high speed/low speed changeover switch 53 is adapted to control revolution speed of the traveling motor 37 for high speed traveling and low speed traveling of the traveling vehicle. The controller 61 outputs a speed command signal to a speed controller 70 on the basis of an input signal. By this speed command signal, the speed controller 70 controls current supply for the traveling motor 37. Namely, by controlling current supply for the left rear traveling motor 37L and right front traveling motor 37R, the traveling speed of the vehicle is controlled. Also, the controller 61 outputs a steering command signal to a steering driver 71 on the basis of the input signal for controlling current supply for the steering motor 40 by the steering driver 71. Namely, by supplying current to a left rear steering motor 40L and a right front steering motor 40R, orientation of the steering and driving wheels 32a and 32b is controlled. Also, the orientations of the steering and driving wheels 32a and 32b are detected by the rotational angle sensors 46. Namely, the orientations of the steering and driving wheels 32a and 32b are detected by a left rear rotational angle sensor 46L and a right front rotational angle sensor 46R and then compared with steering command signals by first comparators 72a and 72b and second comparators 73a and 73b. When matching of the orientations of the steering and driving wheels 32a and 32b with respective steering command signals, current supply for the steering motors 40 is terminated. The longitudinal straight traveling and turning traveling mode calculating portion 63 performs determination of forward revolution, reverse revolution and stopping and further determination of a steering angle. The transverse traveling and turning traveling mode calculating portion 65 performs determination of forward revolution, reverse revolution and stopping and further determination of a steering angle. The oblique traveling mode calculating portion 67 performs determination of forward revolution, reverse revolution and stopping and further determination of a steering angle. The spin turning mode calculating portion 69 performs determination of forward revolution, reverse revolution and stopping and further determination of a steering angle.

Next, discussion will be given for the construction, operation and operational control of the second embodiment.

Figure 19:
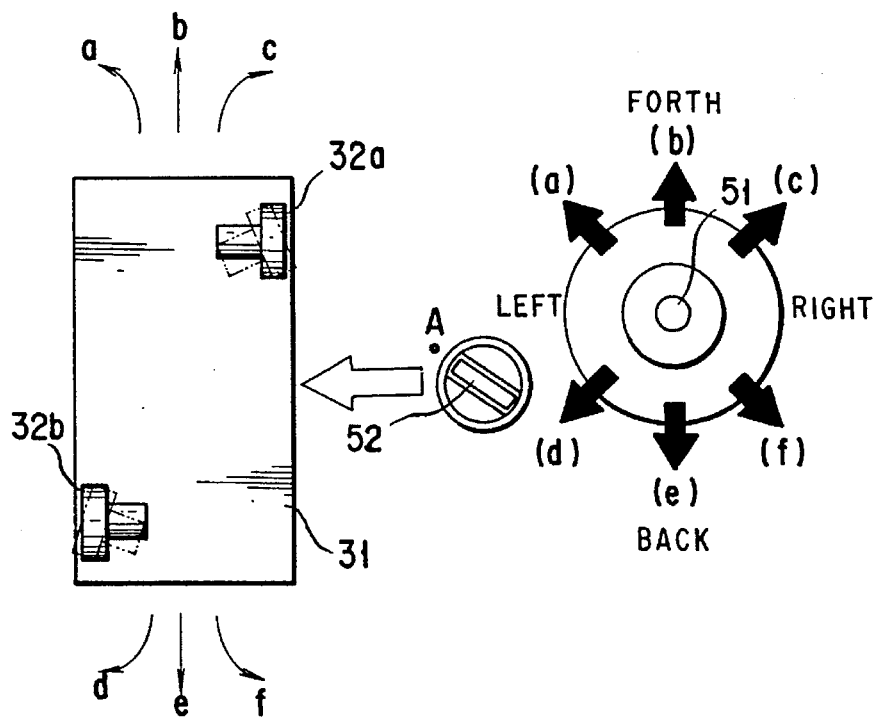
FIG. 19 is an illustration showing a driving condition of the steering and driving wheel at a first position of the traveling mode changeover switch in the second embodiment.

FIG. 19 is an illustration showing the driving condition of the steering and driving wheels 32a and 32b at the first position A of the traveling mode selector switch 52. In FIG. 19, when the traveling mode selector switch 52 is operated at the first position A, the first switch 62 is turned ON to input the ON signal indicative of the longitudinal straight traveling mode to the longitudinal straight traveling and turning traveling mode calculating portion 63. When the operation lever 51 is operated toward forward right (c) at this condition, the forward switch 56 and the right switch 60 are turned ON. Then, the first potentiometer 55 outputs a position signal. The longitudinal straight traveling and turning traveling mode calculating portion 63 outputs a traveling motor forward driving signal to the speed controller 70 on the basis of these signals. Under the control of the speed controller 70, the left rear traveling motor 37L and the right front traveling motor 37R are driven in the forward direction. At the same time, longitudinal straight traveling and turning traveling mode calculating portion 63 outputs a signal derived from calculation of a steering direction and a steering angle to output to the steering driver 71. By a signal from the steering driver 71, the front right steering motor 40R is driven in the forward direction for a predetermined angle to steer the front right steering and driving wheel 32a toward the right, and the rear left steering and driving wheel 32b is steered to be straight in the longitudinal direction.

By this, the traveling vehicle travels in a turning path in the direction shown by the arrow c in FIG. 19. When the operation lever 51 is operated toward forward left (a), the front right steering and driving wheel 32a is steered toward left to cause turning in the direction shown by arrow a. On the other hand, when the operation lever 51 is operated toward forward (b), no signal is input to the steering motor 40 and thus the steering and driving wheel 32a is steered toward straight in the longitudinal direction. When the operation lever 51 is operated in backward left (d), backward (e) and backward right (f), the traveling vehicle turns in the directions of arrow d and f and travels straight in the direction of arrow e.

In this case, both of the steering and driving wheels 32a and 32b are driven in the reverse direction, and the front right steering and driving wheel 32a is steered toward right and left while maintaining the rear left steering and driving wheel 32b straight in the longitudinal direction.

Figure 20:
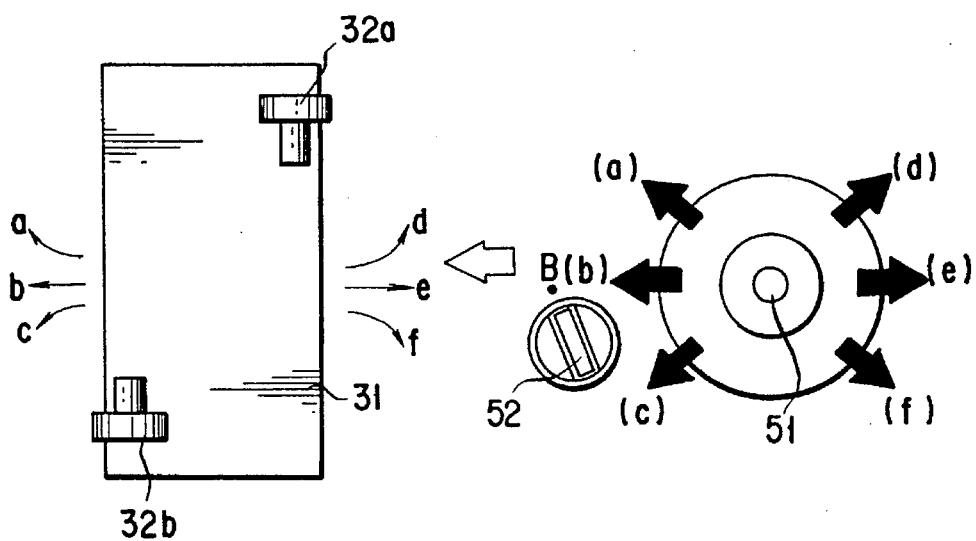
FIG. 20 is an illustration showing a driving condition of the steering and driving wheel at a second position of the traveling mode changeover switch in the second embodiment.

FIG. 20 is an illustration showing the driving condition of the steering and driving wheels 32a and 32b in the case where the traveling mode selector switch 52 is operated in the second position B. In FIG. 20, when the traveling mode selector switch 52 is switched into the second position B, the second switch 64 is turned ON to output the ON signal indicative of the transverse traveling mode to the transverse traveling and turning traveling mode calculating portion 65. In this condition, when the operation lever 51 is operated toward left (b), the signal is output to the steering motors 40. Then, the steering and driving wheels 32a and 32b are steered for 90° to be oriented in the transverse direction. Simultaneously, the traveling motors 37 are driven in the forward direction so that the traveling vehicle travels toward the left as shown by the arrow b.

On the other hand, when the operation lever 51 is operated toward right (e), the signal is fed to the steering motors 40. Thus, the steering and driving wheels 32a and 32b are steered over 90° to be oriented in the transverse direction. Simultaneously, the traveling motors 37 are driven in the reverse direction to move the vehicle toward the right as shown by the arrow e. Similarly, when the operation lever 51 is operated toward forward left (a), backward left (c), forward right (d) and backward right (f) respectively, one of the steering and driving wheels 32a and 32b is driven to be oriented transversely and the other is steered to be slightly oblique to the transverse direction so that the traveling vehicle travels in the direction of arrows a, c, d and f.

It should be appreciated that, in this case, it is possible to steer both of the steering and driving wheels 32a and 32b in the transverse direction and turning is made by providing a rotation speed difference.

Figure 21:
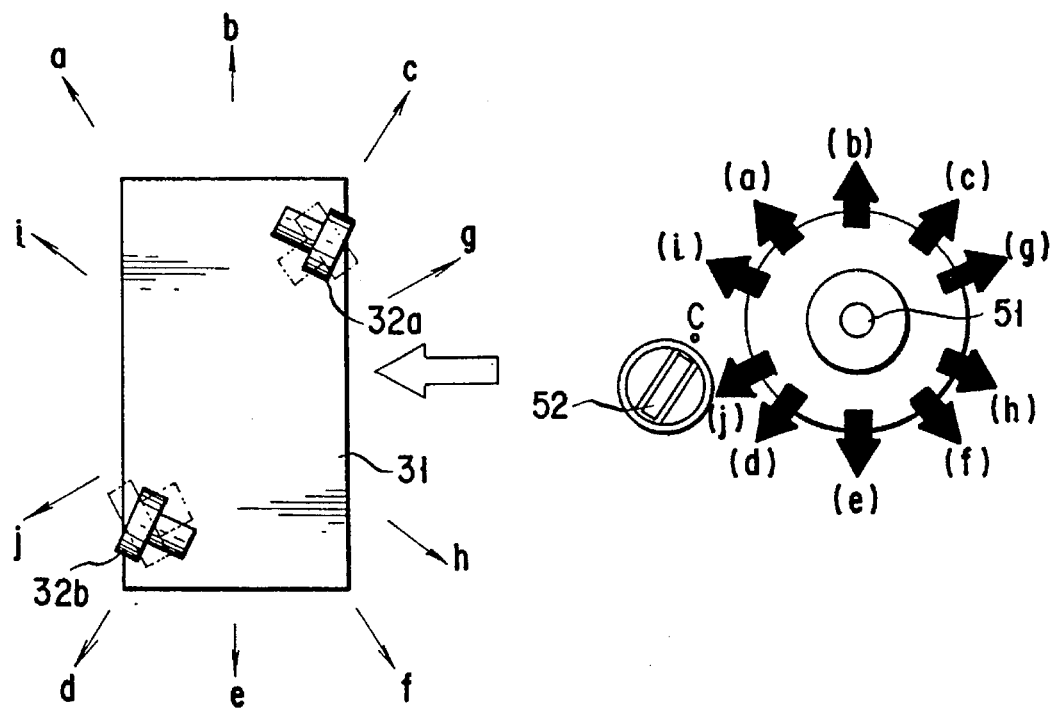
FIG. 21 is an illustration showing a driving condition of the steering and driving wheel at a third position of the traveling mode changeover switch in the second embodiment.

FIG. 21 is an illustration showing the driving condition of the steering and driving wheels 32a and 32b in the case where the traveling mode selector switch 52 is operated in the third position C. In FIG. 21, when the traveling mode selector switch 52 is switched into the third position, the third switch 66 is turned ON to input the ON signal indicative of the oblique travel mode to the oblique traveling mode calculating portion 67. In this condition, when the operation lever 51 is operated toward forward left (a), forward (b), forward right (c), forward inclined toward left (i) and forward inclined toward right (g), the traveling motors 37 are driven in forward direction, and the steering motors 40 are driven in the same direction to steer the steering and driving wheels 32a and 32b in the same direction to make the vehicle travel obliquely as shown by arrows a, b, c, i and g. On the other hand, when operation lever 51 is operated toward backward left (d), backward (e), backward right (f), backward inclined toward left (j) and backward inclined toward right (h), the traveling motors 37 are driven in the reverse direction, and the steering motors 40 are driven in the same direction to steer the steering and driving wheels 32a and 32b in the same direction to make the vehicle to travel in oblique as shown by arrows d, e, f, j, h.

Figure 22:
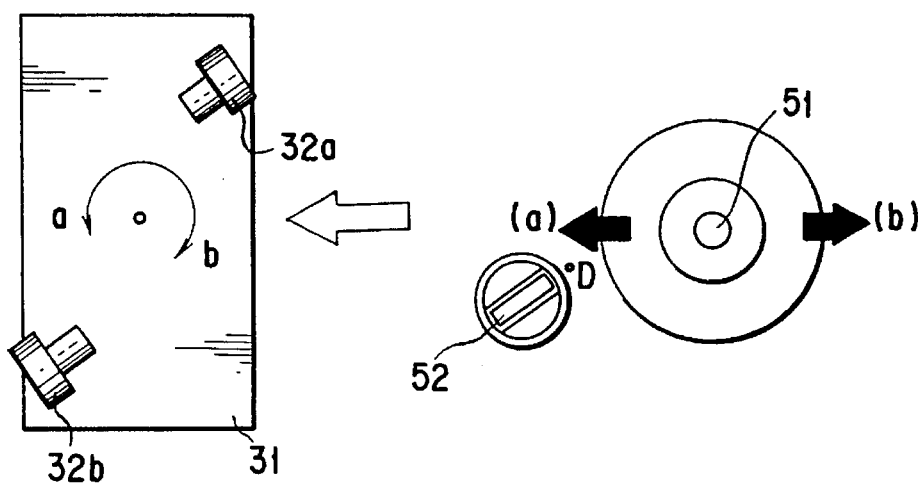
FIG. 22 is an illustration showing a driving condition of the steering and driving wheel at a fourth position of the traveling mode changeover switch in the second embodiment.

FIG. 22 is an illustration showing the driving condition of the steering and driving wheels 32a and 32b in the case where the traveling mode selector switch 52 is operated in the fourth position D. In FIG. 22, when the traveling mode selector switch 52 is switched into the fourth position D, the fourth switch 68 is turned ON to input the ON signal indicative of the spin turning mode to the spin turning mode calculating portion 69. At this condition, when the operation lever 51 is operated toward left (a) or right (b), the traveling motors 37 are driven in forward or reverse direction, and the steering motors 40 are driven in the same direction. By this rotation, the steering and driving wheels 32 are steered in an orientation of 45°. Thus, by forward or reverse direction of revolution of the traveling motors 37, the vehicle performs spin turning toward left or right as shown by arrows a or b.

As can be clear from the foregoing discussion, in the second embodiment, forward straight traveling and turning, transverse traveling and turning, oblique traveling and spin turning are performed by operating the operation lever 51 after operating the traveling mode selector switch 52. Accordingly, the operation becomes simplified. Also, by determining the steering angle of the steering and driving wheels by the command value from the controller, the typically used limit switch is unnecessary to simplify the construction and the necessity of cumbersome position adjustment.

Although the invention has been illustrated and described with respect to exemplary embodiments thereof, it should be understood by those skilled in the art that the foregoing and various other changes, omissions and additions may be made therein and thereto, without departing from the spirit and scope of the present invention. Therefore, the present invention should not be understood as limited to the specific embodiment set out above but to include all possible embodiments which can be embodied within the scope encompassed and equivalents thereof with respect to the features set out in the appended claims.

Industrially Applicable Field

As set forth above, the operation control system for the traveling vehicle according to the present invention is useful for a traveling vehicle which varies orientation of the traveling vehicle in the desired direction of the longitudinal straight traveling, oblique traveling, transverse traveling, spin turning and so forth, such as the mobile telescopic aerial platform.

We claim:

1. An operation control system for a traveling vehicle having first and second driving wheels arranged along one diagonal line of a vehicle body for turning by means of respective turning actuators coupled to said driving wheels and idler wheels pivotally arranged along another diagonal line of the vehicle body, the operation control system comprising:

traveling mode selection changeover means for selecting a desired traveling mode among a plurality of traveling modes;

operation lever means for selecting a desired traveling direction in said desired traveling mode; and control means for:

controlling driving of said turning actuators in response only to inputting of a traveling mode signal from said traveling mode selection changeover means for driving at least one of said turning actuators to turn the respective driving wheels of said at least one driven turning actuator to a predetermined initial position corresponding to said selected traveling mode, and further controlling driving of only said first turning actuator in response to any turning direction selected as the traveling direction in said selected traveling mode.

2. An operation control system for a traveling vehicle as set forth in claim 1, wherein said plurality of traveling modes includes at least one of a longitudinal straight traveling mode, an oblique traveling mode, a lateral traveling mode, a turning traveling mode, and a spin turning mode.

3. An operation control system for a traveling vehicle as set forth in claim 1, which further comprises angle detecting means for detecting a turning angle of at least one said driving wheel, and wherein said control means operates said driving wheels at the predetermined initial position in the selected traveling mode.

4. An operation control system for a traveling vehicle as set forth in claim 3, wherein said plurality of traveling modes includes at least one of a longitudinal straight traveling mode, an oblique traveling mode, a lateral traveling mode, a turning traveling mode, and a spin turning mode.

5. A traveling vehicle comprising:

a vehicle body;

steering and driving wheels located at diagonally spaced positions arranged along one diagonal line of a vehicle body;

idler wheels located at diagonally spaced positions arranged along another diagonal line of the vehicle body;

a traveling motor for selectively driving said steering and driving wheels in forward and reverse directions;

a steering motor for steering said steering and driving wheels; and an operation control system for controlling traveling of the traveling vehicle, the operation control system including:

an operation lever device arranged to be operated in an arbitrary direction of longitudinal and transverse directions and for outputting a signal corresponding to the operated direction of the operation lever device;

a traveling mode selection switch for selecting a traveling mode of the vehicle; and a controller for outputting control signals to said traveling and steering motors on the basis of an output signal of said operation lever device and the traveling mode selected by said traveling mode selection switch.

6. A traveling vehicle as set forth in claim 5, wherein:

said controller includes a longitudinal straight traveling and turning traveling mode calculating portion, a transverse traveling and turning traveling mode calculating portion, an oblique traveling mode calculating portion and a spin turning mode calculating portion;

said traveling mode selection switch selects first, second, third and fourth positions; and corresponding to selection by said traveling mode selection switch, said longitudinal straight traveling and turning traveling mode calculating portion, transverse traveling and turning traveling mode calculating portion, oblique traveling mode calculating portion and spin turning mode calculating portion is selected to output a speed command signal to a speed controller and a steering command signal to a steering driver which controls movement of said vehicle.

7. A traveling vehicle, comprising:

a vehicle body;

steerable driving wheels mounted to the vehicle body, each of said steerable driving wheels being turnable for varying a toe orientation about a first axis extending in a substantially vertical direction and each of said steerable driving wheels being rotatable about a second axis extending in a substantially horizontal direction for travelling of the vehicle;

idler wheels mounted to the vehicle body;

turning actuators, each associated with a corresponding one of said steerable driving wheels for driving said corresponding steerable driving wheels to cause turning to vary the toe orientation;

driving mechanisms, each associated with one of said steerable driving wheels for controlling traveling of the vehicle; and an operation control system for controlling traveling of the traveling. Vehicle, the operation control system including:

a manually operable mode selector switch for selecting a traveling mode of the vehicle among a plurality of mutually distinct traveling modes, said mode selector switch outputting a mode selection signal;

a manually operable operation lever for inputting an operation command for controlling traveling of the vehicle, said operation lever generating a traveling control signal; and a controller operable in a plurality of mutually distinct operational modes and responsive to said mode selection signal of said mode selector switch to establish one of said operational modes and in conjunction therewith to generate a turning control signal for operating said turn actuators for setting toe orientations of said steerable driving wheels to a predetermined initial position corresponding to the selected operational mode, and said controller being further responsive to said traveling control signal from said operation lever for generating a travel control signal according to predetermined operational pattern in the selected operational mode to be supplied to said driving mechanism for controlling traveling behavior of the vehicle.

8. An operation control system for a traveling vehicle having first and second driving wheels arranged along one diagonal line of a vehicle body for turning by means of respective turning actuators coupled to said driving wheels, idler wheels pivotally arranged along another diagonal line of the vehicle body, and driving motors for rotatably driving said first and second driving wheels, the operation control system comprising:

traveling mode selection changeover means for selecting a desired traveling mode among a plurality of traveling modes;

operation lever means for selecting a desired traveling direction in said desired traveling mode; and control means for:

controlling driving of said turning actuators in response only to inputting of a traveling mode signal from said traveling mode selection changeover means for driving at least one of said turning actuators to turn the respective driving wheels of said at least one driven turning actuator to a predetermined initial position corresponding to said selected traveling mode, and further controlling driving of said driving motors to drive said first and second driving wheels at different speeds in response to any turning direction selected as the traveling direction in said selected traveling mode.

9. An operation control system for a traveling vehicle as set forth in claim 8, wherein said plurality of traveling modes includes at least one of a longitudinal straight traveling mode, an oblique traveling mode, a lateral traveling mode, a turning traveling mode, and a spin turning mode.

10. An operation control system for a traveling vehicle as set forth in claim 8, which further comprises angle detecting means for detecting a turning angle of at least one said driving wheel, and wherein said control means operates said driving wheels at the predetermined initial position in the selected traveling mode.

11. An operation control system for a traveling vehicle as set forth in claim 10, wherein said plurality of traveling modes includes at least one of a longitudinal straight traveling mode, an oblique traveling mode, a lateral traveling mode, a turning traveling mode, and a spin turning mode.

* * * * *